United States Patent [19]

Berkstresser et al.

[11] Patent Number: 4,755,715
[45] Date of Patent: Jul. 5, 1988

[54] PR:TB ACTIVATED PHOSPHOR FOR USE IN CRTS

[75] Inventors: George W. Berkstresser, Bridgewater; Joseph Shmulovich, Murray Hill, both of N.J.

[73] Assignee: American Telephone & Telegraph Company, AT&T Bell Laboratories, Murray Hill, N.J.

[21] Appl. No.: 834,557

[22] Filed: Feb. 28, 1986

[51] Int. Cl.$^4$ .............................................. C09K 11/80
[52] U.S. Cl. .............................. 313/468; 252/301.4 R; 428/690
[58] Field of Search ................. 252/301.4 R; 428/690; 313/468

[56] References Cited

U.S. PATENT DOCUMENTS

| 3,790,405 | 2/1974 | Levinstein | 117/201 |
|---|---|---|---|
| 4,180,477 | 12/1979 | Barnes | 252/301 |
| 4,512,912 | 4/1985 | Matsuda et al. | 252/301.4 R X |
| 4,550,256 | 10/1985 | Berkstresser et al. | 250/483 |

FOREIGN PATENT DOCUMENTS 161820  11/1985  European Pat. Off. ...... 252/301.4 R

OTHER PUBLICATIONS

"Preparation, Optimization, and Cathodoluminescent Properties of a Line Emission Penetration Phosphor", *Journal of the Electrochemical Society*, vol. 129, No. 7, Jul. 1982, pp. 1540–1546, T. E. Clark et al.
"Growth of High-Quality Garnet Thin Films from Supercooled Melts", *Applied Physics Letters*, vol. 19, No. 11, Dec. 1971, pp. 486–488, H. J. Levinstein et al.
"rf Sputtered Luminescent Rare-Earth Oxysulfide Films", *Journal of Vacuum Science and Technology*, vol. 10, No. 5, Sep.–Oct. 1973, pp. 616–620, T. G. Maple et al.
"Thin Single Crystalline Phosphor Layers Grown by Liquid Phase Epitaxy", Phillips, *Journal of Research*, vol. 35, No. 6, 1980, pp. 354–371, J. M. Robertson et al.
"Optical Characteristics of Cathode Ray Tube Screens", *Electronic Industries Association*, TEPAC Publication No. 116, (1980), pp. 1–191, EIA Engineering Advisory Council (TEPAC).
"The Luminescence of Pr$^{3+}$ in Garnet Phosphors", *Extended Abstracts of the Electrochemical Society*, vol. 85-2, (Fall mtg., Oct. 1985), pp. 600–601, B. J. Green et al.

*Primary Examiner*—Jack Cooper
*Attorney, Agent, or Firm*—Michael J. Urbano

[57] ABSTRACT

A phosphor for use in CRTs comprises $(Y_{3-p-m-n}R_pPr_mTb_n)(Al_{5-q}Z_q)O_{12}$, where R is a lanthanide element and Z is a Group III element. One embodiment described is a single crystal of $(Y_{3-m-n}Pr_mTb_n)Al_5O_{12}$ in which the trivalent Pr and Tb activators exhibit co-emission and the phosphor emits white light.

6 Claims, 2 Drawing Sheets

PR:TB ACTIVATED PHOSPHOR FOR USE IN CRTS

BACKGROUND OF THE INVENTION

This invention relates to cathode ray tubes (CRTs) and, in one embodiment, to white phosphors for use in such tubes. The term "white" phosphor as used herein means a material which has a cathodoluminescence spectrum including a plurality of spectral lines (wavelengths) in the visible such that the integrated effect is that of white light. The appearance of a light source is defined by the Standard Illuminants established in 1931 by the Commission Internationale de l'Eclairage (C.I.E.). Quantitatively, the color of a phosphor's emission is plotted as an (x,y) coordinate on a C.I.E. chromaticity diagram.

A CRT phosphor may be either a crystalline powder, an amorphous form, or a single crystal. Powders are commonplace and have formed the basis of the CRT (television, monitors, etc.) industry for decades. Although powder phosphors have good light extraction qualities, they have limited resolution due to a light scattering by the powder particles and limited brightness due to thermal loading effects. In the powder phosphor industry white light emission is produced by physically mixing different phosphors which emit the primary colors. Examples of such mixtures include those designated P4, P18 and P22 by the Electronics Industries Association, TEPAC Publication No. 116 (1980). However, this approach suffers from a lack of uniformity which is particularly deleterious in high resolution applications where small grain size is important. In addition, because each pixel must include three grains, one of each color phosphor, the grain sizes must be smaller for a given resolution. Yet, smaller grains have lower cathodoluminescence efficiency.

Very little work has been reported on amorphous phosphors.

A single crystal phosphor, on the other hand, has the unique ability to meet the requirements of small format, high resolution displays because of the absence of light scattering within the single crystal. By comparison, a powder phosphor target for use in a high resolution CRT display has about half the resolution of its single crystal analog. Notwithstanding these advantages of single crystal targets, the prior art has failed to demonstrate a practical single crystal white phosphor material. For example, J. M. Robertson et al have reported in *Philips Journal of Research*, Vol. 35, p. 354 (1980) the LPE growth of epitaxial YAG phosphors doped with a single trivalent activator (e.g., Tb, Eu, Ce, Sm, Pr, Dy or Tm) that produces emission at specific visible lines. However, simultaneous emission (i.e., co-emission) from two or more activators present together in YAG is not disclosed. Moreover, such co-emission is not obvious from the demonstration of emission of a single activator in YAG because it is frequently the case that the presence of a second activator quenches emission from the first activator and/or conversely, so that emission from both activators may be inhibited. We have found that this quenching phenomenon occurred, for example, when Cr was added to Ce:Bi-doped YAG in an attempt to create a white phosphor. Even though Cr-doped YAG by itself produces red emission and Ce:Bi-doped YAG produces blue-green emission, the addition of Cr to Ce and Bi in YAG quenched the emission of all three. Thus, the prior art has failed to demonstrate not only co-emission from a YAG phosphor but also white light emission from a YAG phosphor. Yet, many applications such as radiology and topography utilize a black and white format which requires a white phosphor.

Other prior art approaches to achieving white light emission rely on a penetration tube design. In one design, as described by T. E. Clark et al, *Journal of the Electrochemical Society*, Vol. 129, No. 7, p. 1540 (1982), each phosphor particle is coated with a nonluminescent layer which in turn is coated with a different phosphor layer. The e-beam energy is controlled so that for one energy level both phosphors emit light whereas for a lower energy level only the outer phosphor emits light. The efficiency of this design is low, however, because of the nonluminescent layer which absorbs some of the e-beam energy but does not emit light. In addition, the coated particles are difficult to manufacture. In another design described by T. G. Maple et al, *Journal of Vacuum Science and Technology*, Vol. 10, No. 5, p. 616 (1973), the target includes two or more sputtered phosphor layers which are stacked on top of one another. The layers are simultaneously excited by the electron beam so that a white color appears to be emitted by the CRT. This multiple layer target design has several serious manufacturing problems, however. First, a minimum of two layers must be formed which can seriously reduce the yield, as compared to targets which have only a single phosphor layer. Second, the deflection of the electron beam across the target yields a length, L, over which the energy is dissipated given by $L = d/\cos\theta$, where d is the vertical depth into the phosphor and $\theta$ is the angle of incidence measured from the normal to the surface. $\theta$ can range from about 30 degrees for a 25 mm diameter CRT to 45 degrees for a 75 mm diameter display. The result is that more energy is dissipated in the top layer as the beam sweeps to larger radii, resulting in a shift of the color away from the white at the center of the display.

The preceding prior art work on powder mixtures and penetration tube designs utilized multiple phosphors in their attempts to achieve white light emission. However, examples of single phosphors which produce white emission are the Pr-activated garnet powders described by B. J. Green et al, *Extended Abstracts of the Electrochemical Society*, Las Vegas Meeting Oct. 14–18, 1985, but the only Pr-activated YAG powder produced a reddish-pink color (not white light) as indicated by the wavelength and intensity information of Table 1 and the C.I.E. coordinates of FIG. 1 of the abstract.

SUMMARY OF THE INVENTION

In accordance with one aspect of our invention, a cathodoluminescent phosphor for use in a CRT comprises a material having a composition of the form $(Y_{3-p-m-n}R_p Pr_m Tb_n)(Al_{5-q}Z_q)O_{12}$, which exhibits co-emission from trivalent Tb and Pr, where R is a lanthanide element with an atomic number from 58 to 71, inclusive, and Z is a Group III element. The phosphor may be a single crystal, a crystalline powder, or other suitable form. In a currently preferred embodiment the phosphor comprises $(Y_{3-m-n}Pr_m Tb_n)Al_5 O_{12}$ and the concentrations (moles m and n) of trivalent Pr and Tb produce white light emission. To achieve such emission the concentration of Pr is in the range $0.005 \lesssim m \lesssim 0.015$ and that of Tb is in the range of $0.005 \lesssim n \lesssim 0.030$, and preferably $0.010 \lesssim n \lesssim 0.017$.

BRIEF DESCRIPTION OF THE DRAWING

Our invention, together with its various features and advantages, can be readily understood from the following more detailed description taken in conjunction with the accompanying drawing in which.

DETAILED DESCRIPTION

Figure 1:
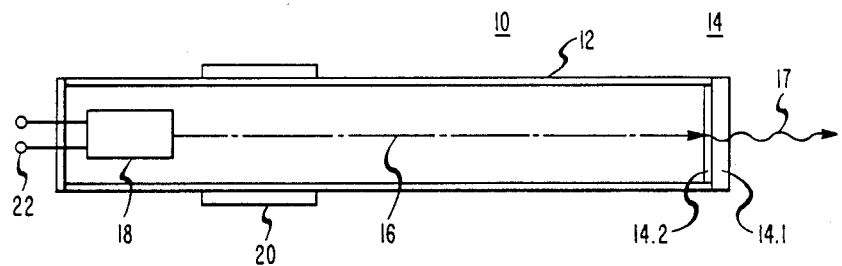
FIG. 1 is a schematic of a CRT in accordance with one embodiment of our invention. In the interests of simplicity, the figure is not drawn to scale.

Turning now to FIG. 1, there is shown a miniature CRT 10 comprising a cylindrical glass tube 12 and a target 14 sealed to one end thereof so that together they form an evacuated enclosure for the electron beam (e-beam) 16. The target illustratively includes a transparent substrate 14.1 and a phosphor layer 14.2 on the interior surface thereof. The phosphor layer 14.2 may be an epitaxial single crystal in which case the substrate 14.1 is single crystal material, or it may be a crystalline powder in which case substrate 14.1 may be a suitable glaze. The e-beam 16 is generated by a cathode 18 and is deflected by electrostatic or magnetic means 20 so as to scan across the phosphor layer 14.2, thereby generating a scanning spot of light depicted by light beam 17. Information may be impressed on the e-beam by any means well known in the art such as, for example, by modulating the beam current via a circuit (not shown) connected to terminals 22.

In accordance with one aspect of our invention, the phosphor layer 14.2 comprises a material having a composition of the form $(Y_{3-p-m-n}R_pPr_mTb_n)(Al_{5-p}Z_q)O_{12}$, where R is a lanthanide element with an atomic number from 58 to 71, inclusive, Z is a Group III element, and Pr and Tb are trivalent activators which undergo cathodoluminescent co-emission. In the interest of simplicity, whenever the chemical symbols of Pr or Tb are used hereinafter, it will be understood to mean trivalent Pr ($Pr^{3+}$) and trivalent Tb ($Tb^{3+}$).

As a practical matter, the preferred element Z is Ga and $0 \lesssim q \lesssim 2.5$. On the other hand, the lanthanide (or rare earth) element R may have a concentration of $p \lesssim 0.01$ for atomic numbers 58 to 69, inclusive; that is, for all elements except Yb (atomic number 70) and Lu (atomic number 71) in which case p may range up to $(3-m-n)$. In the limit where $p=3-m-n$, Y is excluded from the composition of the phosphor. An example of such a composition where R=Lu and Z=Ga is $(Lu_{3-m-n}Pr_mTb_n)(Al_3Ga_2)O_{12}$. In a presently preferred embodiment, however, $p=q=0$, the phosphor comprises $(Y_{3-m-n}Pr_mTb_n)Al_5O_{12}$, and the concentrations of Pr and Tb are selected so that co-emission from them generates white light; that is, for Pr $0.005 \lesssim m \lesssim 0.015$ and for Tb $0.005 \lesssim n \lesssim 0.030$, but preferably for Tb $0.010 \lesssim n \lesssim 0.017$. In these ranges strong line emissions at 488 nm and 610 nm from Pr are complemented by the 387 nm, 420 nm and 544 nm line emission from Tb to produce the white light.

In an illustrative embodiment, the phosphor is a single crystal layer grown on a single crystal YAG substrate by well-known liquid phase epitaxy (LPE) techniques previously employed to grow magnetic garnets. See, for example, H. J. Levenstein et al, *Applied Physics Letters*, Vol. 19, p. 486 (1971) and H. J. Levenstein, U.S. Pat. No. 3,790,405 (1974). In this regard a $PbO/B_2O_3$ flux is used. although phosphors with the general formulation described earlier may be grown as epitaxial layers using this LPE technique, the following relates to Pr:Tb:YAG phosphors grown on YAG substrtes. To obtain white light emission the relative concentrations of Pr and Tb are chosen to produce a maximum luminescence of Pr:YAG in the visible, and then the Tb concentration is chosen for the desired color coordinates; i.e., so that (x,y) coordinates of the C.I.E. (1931) chromaticity diagram for $(Y_{3-m-n}Pr_mTb_n)Al_5O_{12}$ are located within the locus for white light. Preferably, therefore, the melt compositions are constituted so that the fractions (f) of the activators in the melt (relative to the total number of moles of y, Tb and Pr in the melt) are in the range of about $0.067 \lesssim f_{Pr} \lesssim 0.200$ and $0.0022 \lesssim f_{Tb} \lesssim 0.0135$. The approximate relationships between the mole fractions in the melt and the corresponding mole fractions in the solid (m,n) are given by $m \approx 0.075 f_{Pr}$ and $n \approx 2.222 f_{Tb}$ for m or n less than 0.2.

EXAMPLES

The following examples describe single crystal phosphors of YAG doped with Pr and Tb so as to emit white light under e-beam excitation in a CRT of the type shown in the FIG. 1. Unless otherwise indicated, specific materials, compositions and other parameters are provided by way of illustration only and are not intended to limit the scope of the invention. The phosphor layers were grown on single crystal YAG substrates by the LPE techniques of Levenstein, above, and were about 5 μm thick.

Prior to incorporating the phosphor layers into CRTs, their cathodoluminescence was characterized at both a low power and high power density excitation mode in a scanning electron microscope (SEM). When operating in the high power density excitation mode, the electron beam power density was approximately $1 \times 10^{10} W/m^2$ with a dwell time on a spot of approximately 120 ns. To evaluate the phosphors at conditions of low power density excitation, the electron beam was defocused and the beam current reduced. All of the data in these examples on the cathodoluminescence performance is normalized to the light output of a reference phosphor comprising $(Y_{2.885}Ce_{0.015}Tb_{0.1})Al_5O_{12}$ for the same excitation conditions. The luminescence of the reference phosphor is assigned a value of 1.00X so that, for example, a 10%. enhancement would be presented as a performance of 1.10X. Spectra were taken using intermediate power density excitation in the SEM and directing the collected light to a spectrometer using a photomultiplier tube as the detector.

Figure 2:
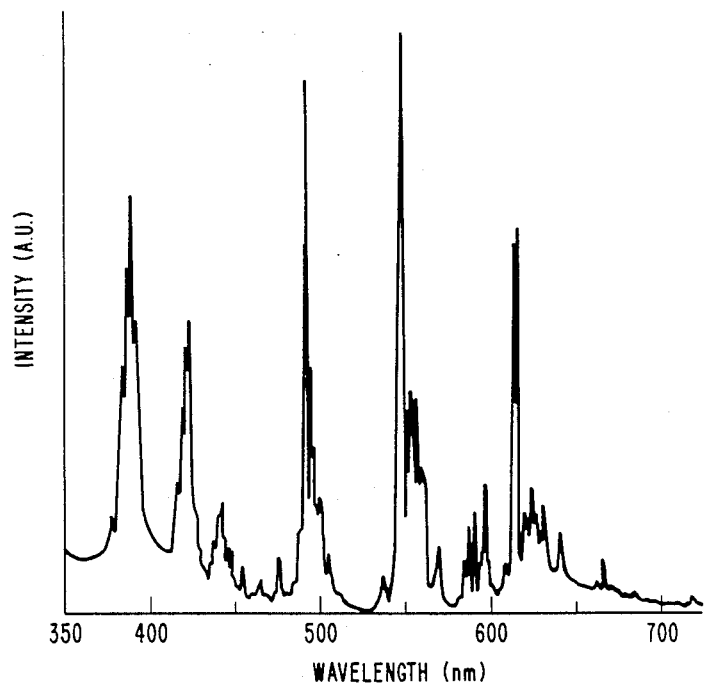
FIGS. 2-3 are spectra of white phosphors having illustrative compositions in accordance with our invention.
Figure 3:
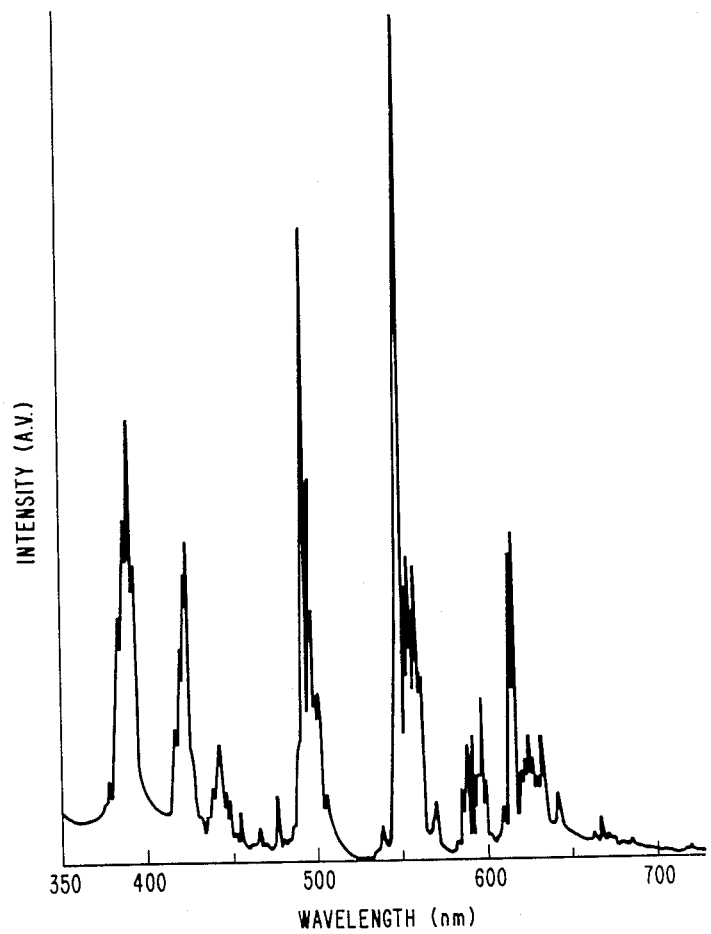

The conversion efficiency of the single layer YAG phosphor was optimized by first varying the concentration of PR in the film to achieve the maximum performance within the 400-700 nm visible wavelength range, without producing too large a difference in the intensity of the 488 and 610 nm lines of Pr. The ratio of the intensities of the 488 and 610 nm lines, as well as the ratio of the intensity of all the visible emissions to the intensity of the UV portion of the spectrum, is strongly dependent upon the Pr concentration. As a result, we have found that the growth of epitaxial films with $f_{Pr}=0.1$ (m=0.0075) provides the best balance between emission in the visible spectrum and efficiency. Without Tb in the phosphor the intensity of the blue and green components (<560 nm) is too weak to compensate for the stronger Pr emission in the red (>600 nm), and the phosphor appears to emit a reddish-pink color. To produce a phosphor which emits white light the green component should be increased to a level which approximates that of the 488 and 610 nm line emissions, and the deep blue emission (400–450 nm) also should be increased to improve the color balance. We have found that all of these requirements are met by the addition of small amounts of Tb to the crystal since this activator has a very strong line emission at 544 nm and several weaker emissions below 450 nm. More specifically, we investigated melt compositions of $f_{Pr}=0.1$ (m=0.0075) and $f_{Tb}$ of 0.0045, 0.0075, 0.022, and 0.045, which produced four phosphor layers having chromaticity coordinates (x,y) of (0.343, 0.348), (0.333, 0.369), (0.345, 0.475) and (0.349, 0.518). With respect to the chromaticity coordinates, the Tb levels of $0.0022 \lesssim f_{Tb} \lesssim 0.0135$ ($0.005 \lesssim n \lesssim 0.030$) produce chromaticity coordinates within the locus for white light emission and hence provide a white color acceptable for black and white display applications. The spectrum of the white phosphor with m=0.0075 and n=0.010 is shown in FIG. 2, and that for m=0.0075 and n=0.017 is shown in FIG. 3.

At high power density excitation the performance of the two phosphors having $f_{Tb}=0.0045$ and 0.0075 are 0.21X and 0.24X, respectively. By comparison the performance of Pr-activated YAG ($Y_{2.9}Pr_{0.1}Al_5O_{12}$) was only 0.17X which demonstrates that Tb enhances the luminescence of the phosphor.

Selection of a $(Y_{3-m-n}Pr_mTb_n)Al_5O_{12}$ composition for white light emission in accordance with this aspect of our invention is not as simple as deciding which has color coordinates closest to (0.33,0.33). The contribution of the Tb emission to the luminous efficacy of $(Y_{3-m-n}Pr_mTb_n)Al_5O_{12}$ is very significant, thus by some latitude in the color coordinate specification the lumen output of the display can be enhanced. As an example, the product of the low power density excitation performance index, $\epsilon$, and the luminous efficacy, $\eta$, of the phosphors with $f_{Tb}$ of 0.0045 and 0.0075 is 66 and 96, respectively. Thus, for increased display brightness it is desirable to push as far toward green, yet preserving the perception of white emission, as is permitted by the display standards set by the user.

In some applications of single crystal white phosphors, for example in very high resolution CRT displays, the quality (i.e., defect density) of the epitaxial phosphor layer is of considerable importance. We investigated such quality from a group of twelve 75 mm, eight 50 mm, and sixteen 25 mm diameter targets. About six were randomly selected, and the surface of the phosphor was examined at a magnification of 48X. Defects larger than 10 $\mu$m were easily detected at this magnification, and from the known area of inspection the defect density was calculated to be 2.2, 3.2 and 3.8 defects/cm$^2$ for target diameters 25, 50 and 75 mm, respectively. However, these defect densities are representative only of the specific LPE apparatus design and details of the epitaxial film growth technique. In addition, this data applies only to the surface of the wafer that faces down during LPE growth, and thus is subject to impingement by particles of garnet which have nucleated in the melt. As the wafer diameter is increased, as noted above, the defect density increases from about 2 to 4 defects/cm$^2$. When the opposite surface (i.e., the surface which is up during the growth) is examined, essentially no defects were detected at the sensitivity of this inspection procedure. Thus, for a conservative approach to the preparation of targets for high resolution displays, the surface of the wafer which is facing down during growth may be polished off after growth is completed. The result would be a CRT target with a defect density approaching about 1/cm$^2$ with the dimensions on the order of the epitaxial layer thickness (about 5 $\mu$m).

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, it will be apparent to those skilled in the art that our phosphor may be produced in powder form using techniques well known to those skilled in the art (e.g., the direct reaction of oxide powders of each of the constituents as described in Japanese Patent Disclosure No. 50-97590, or the co-precipitation from oxide powders dissolved in an acid solution, as described in U.S. Pat. No. 4,180,477). In addition, the CRTs of our invention can be used as a light source in other applications such as hard-copy color printing and photographic color slide reproduction.

What is claimed is:

1. A cathodoluminescent phosphor that emits white light under electron beam excitation, said phosphor having a composition of the form $(Y_{3-m-n}Pr_mTb_n)Al_5O_{12}$ where Pr and Tb are trivalent activators which exhibit co-emission, m and n are the number of moles of Pr and Tb substituted for Y in the phosphor, and $0.005 \lesssim m \lesssim 0.0015$ and $0.005 \lesssim n \lesssim 0.030$.

2. The phosphor of claim 1 wherein $0.010 \lesssim n \lesssim 0.017$.

3. The phosphor of claim 1 wherein said phosphor comprises a crystalline powder.

4. The phosphor of claim 1 wherein said phosphor comprises a single crystal.

5. The phosphor of claim 1 wherein said phosphor comprises an epitaxial single crystal layer grown from a melt by liquid phase epitaxy on a $Y_3Al_5O_{12}$ single crystal substrate and wherein the fraction, f, of Pr and Tb in the melt, relative to the total number of moles in the melt, is in the range of approximately $0.067 \lesssim f_{Pr} \lesssim 0.200$ and $0.0022 \lesssim f_{Tb} \lesssim 0.0135$.

6. A cathode ray tube comprising
an enclosure,
a target including a phosphor layer mounted at one end of said enclosure,
means within said enclosure for generating an electron beam, and
means for scanning said beam across said phosphor layer so as to generate light therefrom,
said phosphor layer having a composition according to any one of claims 1 to 5.

* * * * *

UNITED STATES PATENT AND TRADEMARK OFFICE
CERTIFICATE OF CORRECTION

PATENT NO. : 4,755,715

DATED : July 5, 1988

INVENTOR(S) : G. W. Berkstresser et al.

It is certified that error appears in the above-identified patent and that said Letters Patent is hereby corrected as shown below:

In the Claims, Column 6, line 38, "0.0015" should read --0.015--.

Signed and Sealed this

Fifteenth Day of August, 1989

Attest:

DONALD J. QUIGG

Attesting Officer

Commissioner of Patents and Trademarks